June 14, 1960     J. L. MARCHESE     2,940,118
CARCASS SCRAPER
Filed Jan. 21, 1958     2 Sheets-Sheet 1
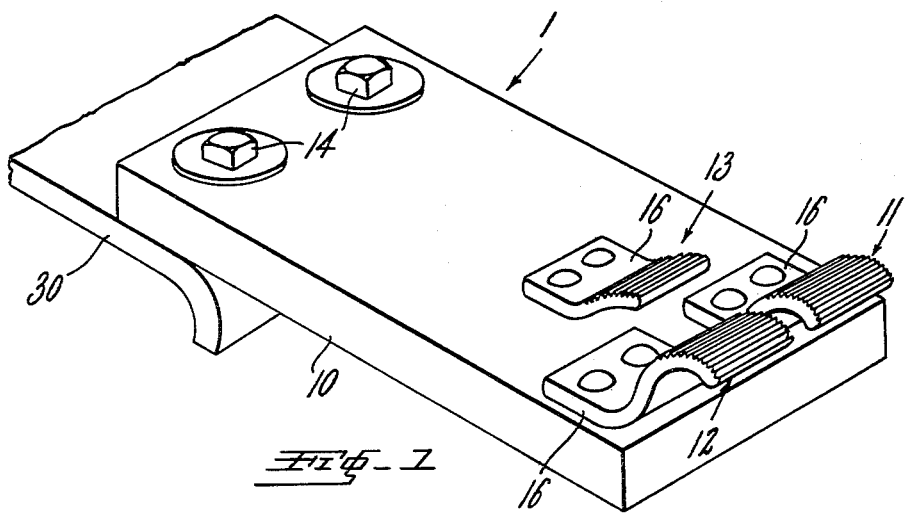
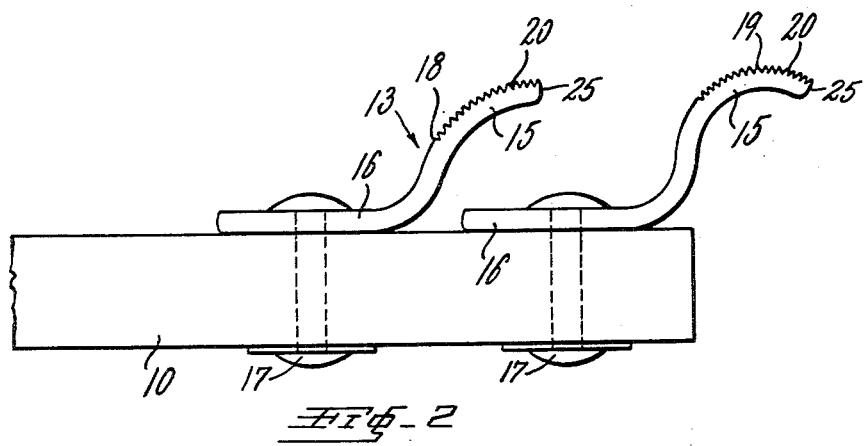
INVENTOR
JOHN L. MARCHESE
BY
Charles A. Blank June 14, 1960   J. L. MARCHESE   2,940,118
CARCASS SCRAPER
Filed Jan. 21, 1958   2 Sheets-Sheet 2
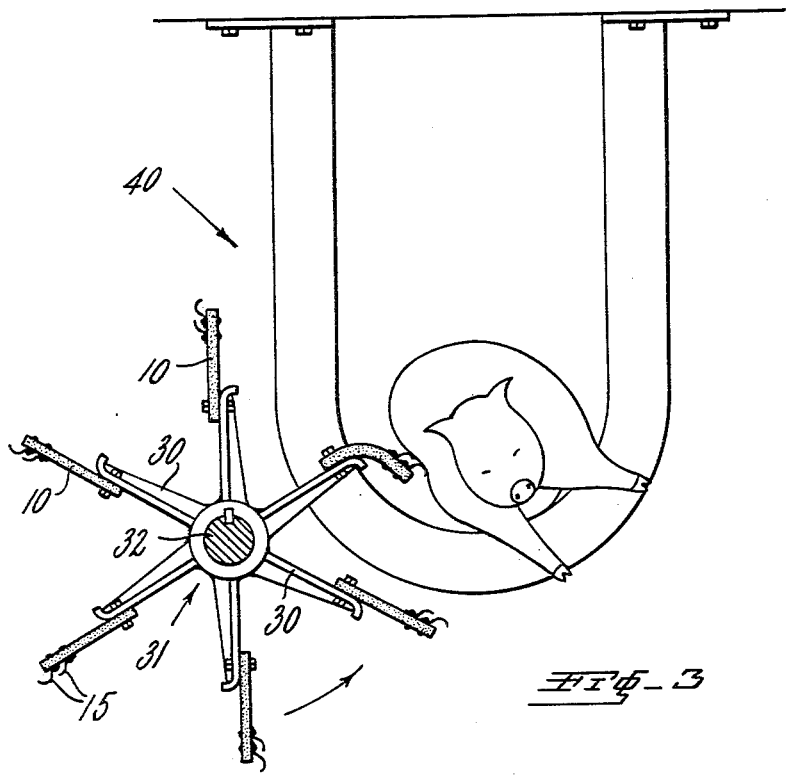
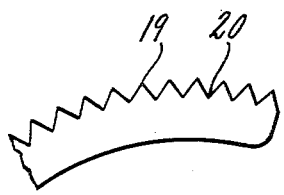
INVENTOR
JOHN L. MARCHESE
BY
Charles C. Blank

United States Patent Office 2,940,118
Patented June 14, 1960

2,940,118
CARCASS SCRAPER

John L. Marchese, East Paterson, N.J., assignor to United States Rubber Corporation, New York, N.Y., a corporation of New Jersey Filed Jan. 21, 1958, Ser. No. 710,284

2 Claims. (Cl. 17—18)

This invention relates to beaters for dehairing and cleaning carcasses, particularly hog carcasses.

Generally hog carcasses are cleaned by passing them along a trough, after a scalding dip, and flailing them with a number of paddles secured, like the spokes of a rimless wheel, to a rotating shaft. The paddles are flexible and made of some suitable material, such as plies of rubber and fabric. As the shaft rotates, the free end of the paddle strikes the carcass and is drawn over it. Steel scrapers attached to the end of the paddle cut away the hair.

Heretofore the scraper blades were made from a strip of metal plate arcuately shaped to somewhat resemble the reverse of a C. One leg of the arc was sharpened much like the cutting blade of a knife, whereas the other leg provided a means for bolting it to the paddle. When mounted, the curve of the scraper blade was directed upwardly from the paddle surface with its concave side directed inwardly toward the rotatable shaft. In this position, the cutting edge of the blade was at almost right angles to the paddle and extended from the paddle for a considerable distance, such as an inch or more. Consequently, frequently the whole projecting portion of the scraper blade was driven into the carcass to puncture it and create rough spots around which it was impossible to clean and dehair with the flailing action of the paddles. These areas required cleaning by hand.

It is the purpose of this invention to provide a flexible paddle with a metallic scraper having a friction surface thereon that will efficiently clean carcasses without danger of puncturing. The manner in which this is achieved lies in the construction of the blades and their arrangement on the paddle. In general, it entails arranging a plurality of blades on the end portion of a flexible paddle, each blade having a number of cutting edges so as to provide a large striking area in comparison to a single knife edge. The cutting portion of the scraper blade is a cylindrical segment having closely spaced, axial ridges on its outer cylindrical surface and is mounted on a paddle with the ridges transverse to the paddle length. In effect, it resembles a curved file in which a number of the ridges contact the carcass under the blow of the paddle; the number depending mostly on the force of the blow, stiffness of the paddle, and rigidity of the carcass. In any event, there is resistance to sinking of the scraper blade into the carcass by an increase of blade area contacting the carcass with increased paddle striking force. The hair is removed by a filing action as the blade is drawn across the carcass. The radius of the cylindrical surface may be proportioned to increase or decrease the number of ridges that initially contact the carcass to suitably clean small, delicate carcasses as well as large, tough carcasses, as the case may be.

Other objects and advantages of this invention will appear on reference to the detailed description, claims and drawing, in which:

Fig. 1 is a perspective view of my improved beater;

Fig. 2 is an elevational view of the beater of Fig. 1;

Fig. 3 is an elevational view schematically showing a carcass dehairing machine embodying the improved beater; and Fig. 4 is an exaggerated elevational view of a part of a scraper blade of my invention showing the shape of the cutting ridges.

As shown in Fig. 1 of the drawing the beater, indicated generally as 1, comprises a paddle 10 having a number of scraper blades 11, 12 and 13 riveted to it. Two of the blades, 11 and 12, are on line with each other and located at substantially the tip of the free end of the paddle, while the other 13, is secured between and inward of them.

The paddle 10 is a resiliently flexible, rectangular strip of material formed by vulcanizing together several layers of rubber and rubber impregnated fabric as is well understood in the art. One end of the paddle is secured by bolts 14 to a radial arm 30 of a star wheel 31 (Fig. 3) which is keyed to a rotatable shaft 32 of a conventional U-bar horizontal type hog dehairer machine 40. The paddle is thus a flexible extension of the star wheel arm 30. Six arms and a corresponding number of paddles are shown, but any desirable number may be provided on the star wheel.

Each scraper blade, 11, 12 and 13, includes a curved cutting portion or body 15 and a lateral extension 16 (Fig. 2). Rivets 17 passing through aligned apertures in the extension 16 and the paddle 10 secure the scraper blades to the paddle. In general, each scraper blade is made by curving an end portion of a metallic strip into an arc, thus giving the strip a shape which is somewhat like that of a dipper. The arcuate or curved portion forms the body 15 and is a segment of a cylinder in shape. By segment is meant that portion of a cylinder formed by cutting the cylinder longitudinally with a plane along a chord. The outer cylindrical surface 18 of the body 15 is provided with closely spaced, low ridges, one of which is indicated as 19, formed by serrations 20 having a generally triangular cross-section and contiguous bases as shown in Fig. 4. Each blade 11, 12 and 13, is mounted with its outer surface directed away from the surface of the paddle to which the blade is fastened and with the ridges 19 extending transverse to the paddle's long axis. As clearly shown in Figures 1 and 2, the blades 11, 12 and 13 are curved to have a convex outer face defining an arc such that a plane tangential to the convex outer face and passing through the point on the scraper blade which is at the greatest distance from the paddle will be parallel to the paddle.

For average conditions it is preferred that the body of each scraper blade have approximately fifteen ridges per inch of about $\frac{1}{36}$ of an inch in height and having an apex angle of 90°. For the outermost blades 11 and 12, it is suitable to have an arc subtending an angle of 80° on $\frac{17}{32}$ of an inch radius. To minimize the possibility for hog legs or snout parts becoming wedged between the outermost blades 11 and 12 and the inner blade 13, the arc on blade 13 is smaller and subtends approximately an angle of 59° on a $\frac{13}{16}$ of an inch radius. To deter collecting material between the scraper blades and the paddle 10 the free end 25 (Fig. 2) on each of the blades is raised relatively a considerable distance above the paddle surface. Additionally, in the case of the outer blades, 11 and 12, their body or curved portions extends beyond the end of the paddle as is shown in Fig. 2.

It is apparent that in using the beater of my invention there is a far more even distribution in the contact of the curved surfaces with the hog carcasses than is possible with the conventional blades. Further, even though only one of the blades on the paddle may contact the carcass with the initial blow of the paddle, there is nevertheless no puncturing, since the blades are incapable of puncturing the carcass. Nevertheless, the beater possesses all the cutting efficiency attributable to metallic blades.

Obviously various modifications can be made in the details of the construction to meet various conditions of operation, such as, the frequency of the serrations or ridges, the angle of the blade body arc, and etc. without departing from the spirit of the invention.

Having thus described my invention, what I claim and desire to protect by Letters Patent is:

1. A carcass beater for use as a flexible extension of the radial arms on a star-wheel dehairer machine comprising a flexible paddle and at least one metallic scraper plate having a straight lateral extension portion secured to said paddle and a cylindrically arcuate scraper portion with a convex outer face defining an arc such that a plane tangential to said convex face and passing through the point on said scraper portion which is at the greatest distance from the paddle is parallel to said paddle, said outer convex face having a friction surface thereon for removing the hair from a carcass.

2. A carcass beater as defined in claim 1 wherein the friction surface on said outer convex face is formed by closely spaced serrations on and extending axially of said cylindrically arcuate scraper portion.

References Cited in the file of this patent

UNITED STATES PATENTS

| | | |
|---|---|---|
| 1,001,640 | Hannaford | Aug. 29, 1911 |
| 1,727,690 | Anheuser | Sept. 10, 1929 |
| 2,604,656 | Anderson et al. | July 29, 1952 |
| 2,758,334 | Adams et al. | Aug. 14, 1956 |